(12) United States Patent
Haartsen

(10) Patent No.: US 6,671,292 B1
(45) Date of Patent: Dec. 30, 2003

(54) METHOD AND SYSTEM FOR ADAPTIVE VOICE BUFFERING

(75) Inventor: Jacobus Cornelis Haartsen, Borne (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/344,481

(22) Filed: Jun. 25, 1999

(51) Int. Cl.[7] ................................................. H04J 3/06
(52) U.S. Cl. ........................................ 370/521; 370/412
(58) Field of Search ................................ 370/351, 389, 370/395.52, 412, 413, 414, 417, 419, 424, 464, 465, 473, 230, 477, 521; 379/67.1, 88.08, 88.1, 90.01, 93.01, 93.08; 704/200, 201; 711/110; 375/265, 296, 340, 341, 372

(56) References Cited

U.S. PATENT DOCUMENTS

| | | | |
|---|---|---|---|
| 4,453,247 A | | 6/1984 | Suzuki et al. |
| 4,736,377 A | * | 4/1988 | Bradley et al. ............ 714/703 |
| 4,841,574 A | | 6/1989 | Pham et al. |
| 4,860,359 A | * | 8/1989 | Eicher ........................ 704/275 |
| 5,103,467 A | * | 4/1992 | Bedlek et al. .............. 375/371 |
| 5,148,429 A | | 9/1992 | Kudo et al. |
| 5,293,273 A | * | 3/1994 | Glick ............................ 360/5 |
| 5,353,341 A | | 10/1994 | Gillis |
| 5,439,775 A | | 8/1995 | Takahashi et al. |
| 5,491,837 A | | 2/1996 | Haartsen |
| 5,528,623 A | | 6/1996 | Foster, Jr. |
| 5,596,604 A | * | 1/1997 | Cioffi et al. ................ 375/260 |
| 5,636,243 A | | 6/1997 | Tanaka |
| 5,699,409 A | | 12/1997 | Kojima |
| 5,793,425 A | * | 8/1998 | Balakrishnan ........ 375/240.25 |

(List continued on next page.)

FOREIGN PATENT DOCUMENTS

| | | |
|---|---|---|
| EP | 0329997 | 8/1989 |
| EP | 0399612 | 11/1990 |
| WO | 99/26430 | 5/1999 |

OTHER PUBLICATIONS

Yasuda et al. "A Codec Control Method and its Monitiong Technique for Low Bit–rate Voice Communication Systems". IEEE Global Telecommunications Conference. Nov. 8–12, 1998. pp. 1326–1331.*

Spears, William M., "Simulated Annealing for Hard Satisfiability Problems" in "Cliques, Coloring, and Satifiablity: Second DIMACS Implementation Challenge", David S. Johnson and Michal A. Trick (eds.), DIMACS Series in Discrete Mathematics and Theoretical Computer Science, vol. 26, pp. 533–588, American Mathematical Society (1996).

(List continued on next page.)

*Primary Examiner*—Melvin Marcelo
*Assistant Examiner*—Derrick W Ferris
(74) *Attorney, Agent, or Firm*—Burns, Doane, Swecker & Mathis, L.L.P.

(57) ABSTRACT

A system and method for adaptive voice buffering is disclosed. In a voice transmitter, a ring buffer uses read and write pointers to implement changes in the delay of a communication link. The receiver also implements a ring buffer having read and write pointers to buffer incoming digitized voice information transmitted over the link. Delay changes may be implemented during silent periods to render delay variations in the received signal undetectable to a user of the receiver.

21 Claims, 18 Drawing Sheets

U.S. PATENT DOCUMENTS

| | | | | |
|---|---|---|---|---|
| 5,901,159 A | * | 5/1999 | Ichikawa | 714/756 |
| 5,953,350 A | * | 9/1999 | Higgins | 370/401 |
| 6,088,351 A | * | 7/2000 | Jenkin et al. | 370/347 |
| 6,185,199 B1 | * | 2/2001 | Zehavi | 370/335 |
| 6,195,414 B1 | * | 2/2001 | Simmons et al. | 379/22 |
| 6,205,125 B1 | * | 3/2001 | Proctor et al. | 370/328 |
| 6,205,420 B1 | * | 3/2001 | Takagi et al. | 704/200 |
| 6,356,545 B1 | * | 3/2002 | Vargo et al. | 370/355 |
| 6,366,938 B1 | * | 4/2002 | Levison et al. | 375/343 |
| 6,370,125 B1 | * | 4/2002 | Belk | 370/312 |

OTHER PUBLICATIONS

Haartsen, Jaap, "BLUETOOTH—The universal radio interface for ad–hoc, wireless connectivity", found in Ericsson Review, Telecommunications Technology Journal No. 3, 1998.

* cited by examiner

METHOD AND SYSTEM FOR ADAPTIVE VOICE BUFFERING

BACKGROUND

The invention relates to electrical communication and particularly to a digital voice communication system which may use multiple voice coding rates and/or multiple forward-error-correction (FEC) coding rates.

In the last decades, progress in radio telephone communication technology and very-large scale integration (VLSI) technology has fostered widespread use of radio communication in consumer applications. Portable devices, such as mobile radio telephones, can now be produced having acceptable cost, size and power consumption. Mobile telephone communication for the consumer market started with the phone system derived from the police and rescue services and was based on an analog technology improved and optimized in the 1970's and 1980's. Examples of analog phone systems include Nordic Mobile Telephone (NMT) system and Total Access Communication System (TACS). Mobile phone usage increased significantly in the 1990's with the introduction of mobile phone systems based an digital technology like Global System for Mobile Communication (GSM), Digital Advanced Mobile Phone System (D-AMPS) and Personal Digital Cellular (PDC).

Most digital wireless systems in use today utilize a time slotted system. User information (e.g., speech) is segmented, compressed, packetized and transmitted in a pre-allocated time slot. Time slots can be allocated to different users, a scheme commonly referred to as Time Division Multiple Access (TDMA). Time slots may also be allocated between alternating uplink and downlink transmissions, a scheme commonly referred to as Time Division Duplex (TDD). To improve immunity against interference and fading, time slots can be assigned to different carrier frequencies such that consecutive packets sent to the same user do not use the same carrier frequency. Because the transmitter hops to a new frequency for every new time slot, this scheme is commonly to as Frequency Hopping (FH). FH techniques may be combined with TDD techniques. An exemplary system that implements both FH and TDD techniques is the recently-introduced Bluetooth system, a commercial radio system used to provide wireless connections between portable devices like mobile phones and laptops.

Voice communication is still the dominant service for most commercial wireless systems. Cordless and cellular telephony are now widely accepted, and penetration levels exceed 30% in some developed countries. Several techniques may be used to convey speech information over digital links. In general, the following steps are followed. First, the analog speech waveform is sampled (usually at a rate of 8 kilo samples per second and the samples are digitized (i.e., the analog sample value is approximated by a binary word). The digital signal is then segmented, compressed, packetized, and transmitted over the air interface. The receiver implements the inverse processes to convert the digital signal back to a recognizable voice signal recognizable.

Prior to compression, the digital voice data is segmented. A segment of N bits that for example represent 20 ms speech is collected and buffered. Thereafter, this segment is compressed (e.g., coded) and the compressed segment is then packetized. For example, in GSM, a full-rate speech segment of 20 ms is distributed over 8 packets in 8 slots. Each time slot is about 577 microseconds ($\mu$s). In case of a half-rate codec, the 20 ms speech segment is distributed over 4 packets.

The digitized speech frames are usually compressed to reduce the amount of information transmitted over the air interface. Reducing the amount of information transmitted on each voice link increases the number of voice links that can be supported in the allocated radio spectrum, thus increasing the capacity of the system. Speech compression can be carried out in various ways. In general, speech compression removes redundancies from speech information. In conventional systems, the speech rate on the air interface can range from 2.4 kb/s on satellite links to be between 8 and 13 kb/s on cellular links like D-AMPS and GSM, respectively, to 32 kb/s on DECT systems and 64 kb/s on the Bluetooth system. Some advanced systems apply multi-rate voice coders that increase or decrease the voice coding rate, depending on the interference conditions on the link. If the voice rate is reduced the excess bandwidth may be used to implement error correction protocols to make the voice information more robust against bit errors. Alternatively, the excess bandwidth may be used to increase the capacity of the system. Half-rate speech codecs used in GSM reduce the voice rate to increase the capacity of the system.

The implementation of FEC coding techniques affects system capacity and the delay over the link. Increasing the number of FEC encoding bits applied to a given link decreases the overall system capacity by increasing the data rate required on the link to support a constant voice rate connection. Because a system typically has a fixed aggregate bandwidth, increasing the data rate of a specific link decreases the overall system capacity.

The link delay is determined by the amount of time required to buffer a packet for transmission. Increasing the data rate requires the transmitter to use more time slots to support a constant voice rate connection, which, in turn, reduces the amount of time required to buffer a packet for transmission. Increasing the number of FEC encoding bits applied to a given link increases the required data rate over the link, which tends to decrease the delay over that link.

By way of example, U.S. patent application Ser. No. 08/685,069, entitled A SHORT-RANGE RADIO SYSTEM by P. Dent and J. Haartsen, the disclosure of which is incorporated here by reference, discloses a short-range radio system that uses a constant voice rate of 64 kb/s on a given link. In this system, implementing FEC with a coding rate of 2/3 (e.g., 1 extra coding bit for every 2 data bits) increases the link's required data rate from 64 kb/s to 96 kb/s. Similarly, implementing FEC with a coding rate of 1/3 (e.g. 2 extra coding bits for every 1 data bit) increases the link's required data rate from 64 kb/s to 192 kb/s.

In some circumstances it may be desirable to vary the FEC coding rate dynamically (e.g., during transmission over an active link). For example, when interference is experienced it may be desirable to increase the FEC coding rate to provide additional error correction protection. By contrast, when extra capacity is needed in the system it may be desirable to reduce the FEC coding rate on one or more links to generate additional capacity. The additional capacity may be used for link-related functions such as paging or handovers. Alternatively, additional capacity may be used to support additional links in the system.

Varying the FEC coding rate dynamically may cause a corresponding variation in the delay over the link. Voice transmission requires real-time transmission service. Like other real-time applications, voice transmission does not tolerate variations in delay, which may be noticeable to the listener. Accordingly, there is a need in the art for a system and method for switching between FEC coding schemes on an active voice link without causing delay variations that are detectable to a user of the voice link.

SUMMARY

The invention provides a buffer-driven system and method for adjusting the delay on a communication links when switching between FEC coding schemes. A buffer architecture consisting of multiple buffer sections logically arranged in a ring provides a data structure for changing the delay on a communication link when switching between different coding schemes. The ring buffer includes read and write pointers that may be controlled separately to adjust the link delay when the FEC coding schemes is changed. Minimal round-trip delay may be maintained and negative effects caused by delay variations may be avoided by implementing delay variations during speech pauses.

In one aspect, the present invention provides a transmitter for a communication system. The transmitter comprises a sampler for sampling analog voice information at a predetermined sampling rate, a digitizer for converting the analog voice information to digital data representative of the analog voice information, an encoder for compressing the digital data, a ring buffer system for buffering a predetermined amount of the digital data for packetized transmission across a communication link, and a transmitter section for transmitting packets across a communication link. The ring buffer may include a plurality of independent memory sections, and the number of discrete storage locations in each independent memory section may be determined by a delay resolution of the transmitter.

In another aspect, the present invention also provides a receiver for a communication system. The receiver comprises a receiver section for receiving packets from a communication link, a ring buffer system for buffering a predetermined amount of the packetized data received from the communication link, and a decoder for decompressing the digital data. The ring buffer may include a plurality of independent memory sections, and the number of discrete storage locations in each independent memory section may be determined by a delay resolution of the receiver.

In yet another aspect, the present invention provides a method of operating a communication system. The method comprises the steps of: sampling analog voice information at a predetermined sampling rate, converting the analog voice information to digital data representative of the analog voice information, compressing the digital data, storing the compressed digital data in a ring buffer system for buffering a predetermined amount of the digital data for packetized transmission across a communication link, and transmitting packets across a communication link.

In still another aspect, the present invention provides a method, in a telecommunication system comprising ring buffers at a transmitter and receiver for storing digital data representative of voice information, for changing the delay over an active communication link, comprising the steps of: monitoring voice information at the transmitter to detect a silent period, and during a silent period, changing the relative position of the transmitter's read pointer and write pointer. In the transmitter, the separation between the transmitter's write pointer and the transmitter's read pointer may be reduced to reduce the delay over the link. Alternatively, the separation between the transmitter's write pointer and the transmitter's read pointer may be increased to increase the delay over the link.

DETAILED DESCRIPTION

Figure 1:
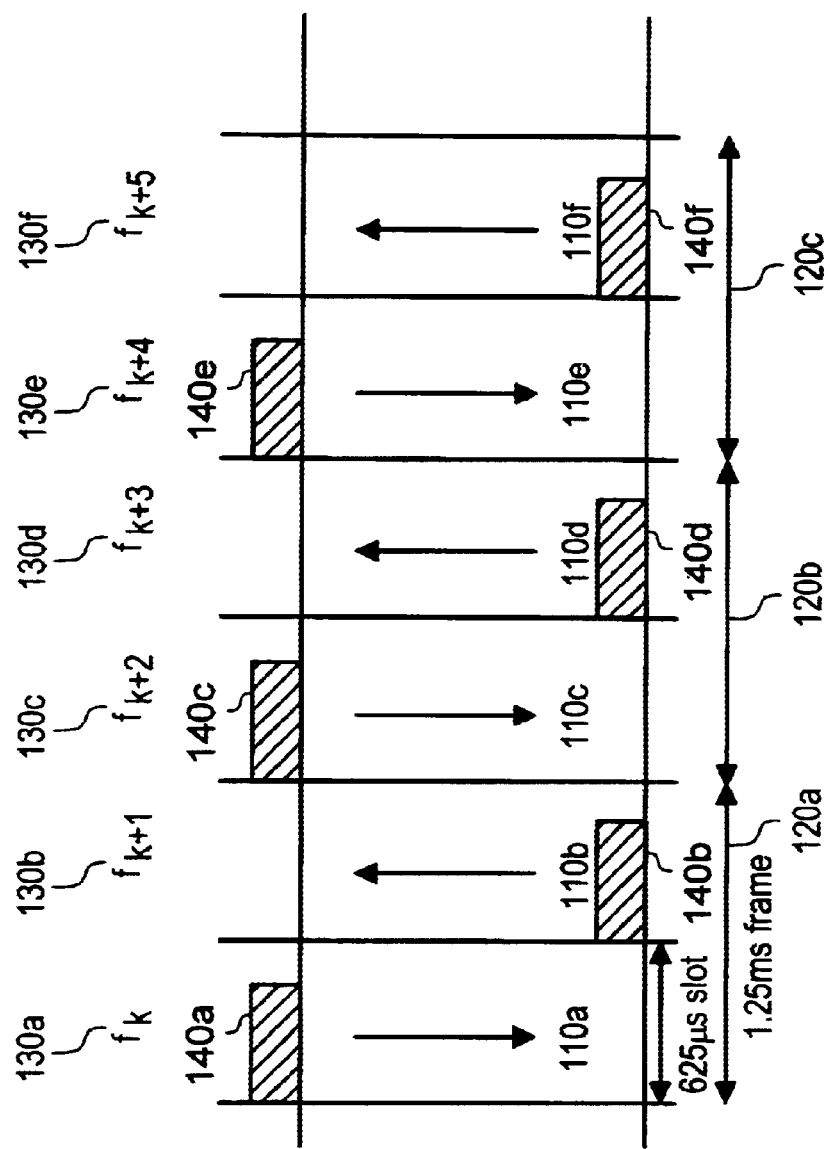
FIG. 1 is a schematic timing diagram illustrating packet exchange in a FH/TDD communication system.

FIG. 1 presents a timing diagram illustrating packet exchange in a FH/TDD communication system. An exemplary radio interface applying a FH/TDD communication procedure is discussed in U.S. patent application Ser. No. 08/685,069. In the FH/TDD timing diagram illustrated in FIG. 1, the time dimension is divided into discrete slots 110a–110f measuring 625 µs, in which a packet or burst can be transmitted. Time slots are alternately used for transmission and reception to support full-duplex operation through Time Division Duplex (TDD). A forward and a return slot together form 1.25 ms frames 120a–120c. A different carrier frequency 130a–130f may be used for each time slot. The sender and the receiver switch frequency synchronously. The FH/TDD system described in the U.S. patent application referenced above implements a hop rate of 1600 frequency cycles/second, which corresponds to the slot rate. A packet 140a–140f data can be sent in each time slot 110a–110f.

Figure 2:
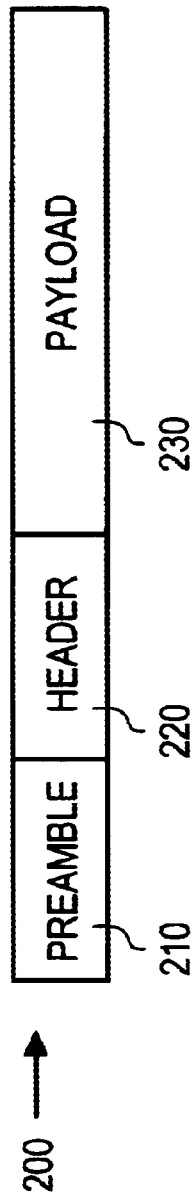
FIG. 2 is a schematic depiction of the format of packets exchanged on a FH/TDD channel.

FIG. 2 is a schematic depiction of the format of packets exchanged on a FH/TDD channel. Referring to FIG. 2, a packet 200 comprises a preamble 210, a header 220, and a payload 230. Preamble 210 is used for frame and bit synchronization and can also be used to adjust radio parameters like frequency and phase in the receiver. Header 220 may also contain general supervisory link information. The format of payload 230 depends on the service provided. For data services, payload 230 may be protected by a Cyclic Redundancy Check (CRC) to check for errors. In combination with the CRC, a retransmission procedure like automatic retransmission query (ARQ) may be deployed so that payloads containing errors are automatically retransmitted by the sender. In addition, extra FEC coding may be applied to correct possible errors in payload 230. If a retransmission scheme is implemented, the retransmission scheme may cause variable delay in data delivery. For most data services, variable delay in data delivery does not present a problem; data integrity has higher priority than delay variations.

Real-time services like voice do not tolerate variable delay over the link. However, voice services can tolerate some errors before the user experiences noticeable quality degradation. In one embodiment of the present invention, packets carrying voice traffic are not retransmitted. Therefore, a CRC that triggers ARQ is not necessary. However, FEC may still be applied to provide more protection against interference. The particular voice coding scheme implemented is not critical to the present invention. The present invention contemplates the use of voice coding schemes like Voice Code-Book Excited Linear Prediction (V-CELP) or Residual Pulse Excitation—Long Term Prediction (RPE-LTP) which remove most redundancy to provide a large amount of compression. The removable of redundancy renders the signal more susceptible to interference, and FEC coding should be implemented to provide extra protection against interference. Thus, it will be recognized that the bandwidth gain obtained with voice compression techniques that remove redundancy is partly lost because extra FEC bits should be added. The present invention also contemplates the use of compression algorithms like the Continuously Variable Slope Delta Modulation (CVSD) algorithm, which provides relatively less compression but retains a measure of redundancy. Thus a CVSD compressed signal is more robust against interference. CVSD is a delta modulation coding algorithm that is rather immune to errors. CVSD is suitable for use in a FH/TDD scheme where interference conditions can vary considerably per packet.

Figure 3:
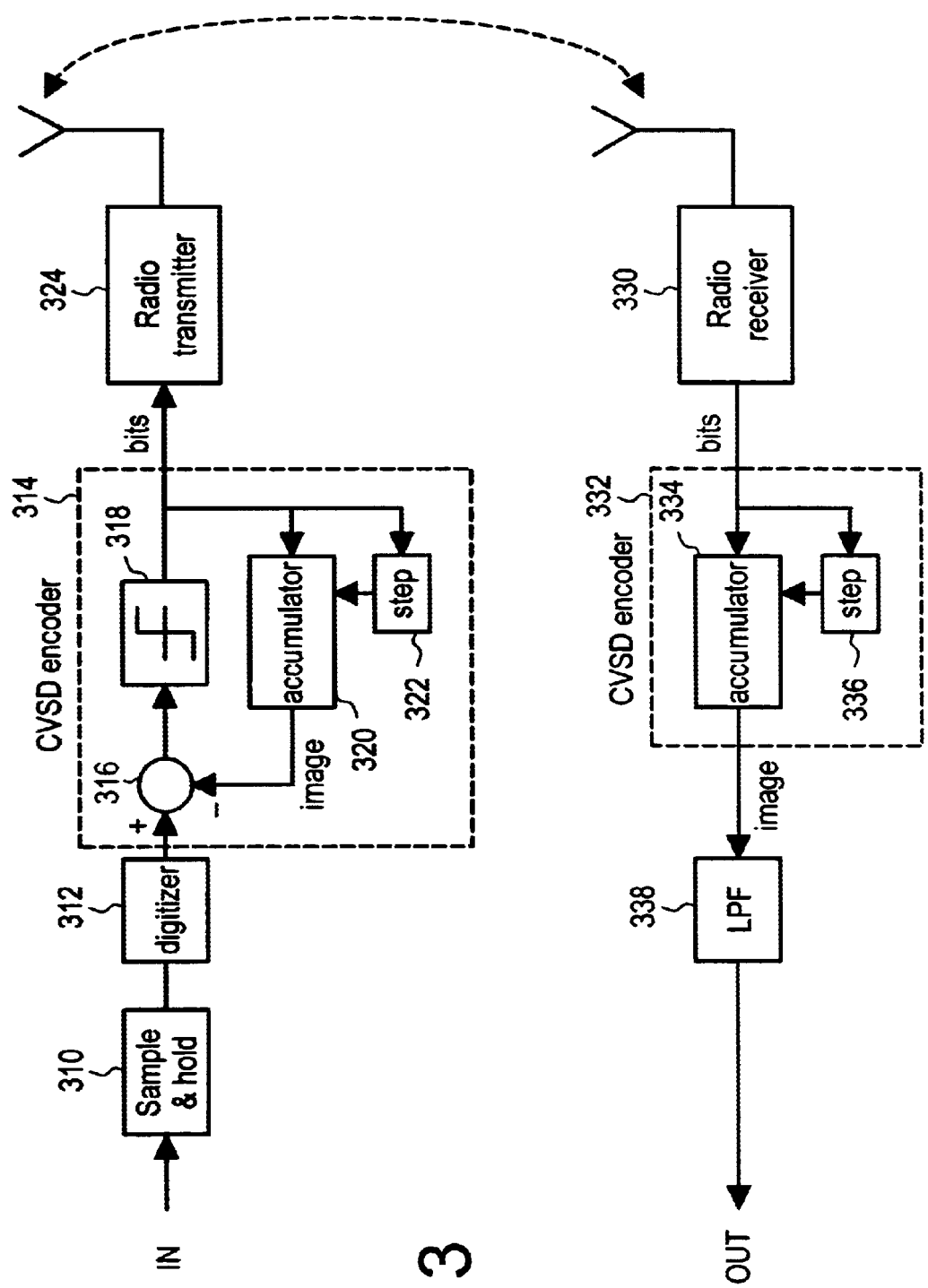
FIG. 3 is a schematic depiction of an exemplary transmission system that implements a CVSD coding scheme in a radio environment.

FIG. 3 is a schematic depiction of an exemplary transmission system that implements a CVSD coding scheme in a radio environment according to an embodiment of the present invention. Referring to FIG. 3, sampler 310 samples the analog speech waveform and digitizer 312 converts the analog speech waveform into a digital signal. In one embodiment, the present invention employs a 64 kb/s CVSD codec that samples at a rate of 64 ks/s. This sample rate may be obtained either by sampling the analog waveform directly at 64 ks/s, or by sampling at 8 ks/s (as required for a voice signal) and interpolating the sample signal to obtain a 64 ks/s signal stream.

CVSD encoder 314 produces a digital output signal that follows the digitized input signal by re-creating an image of the input signal. The difference between the image and the input signal provides one bit of information (i.e., whether the image is larger or smaller than the input signal) which is used to control the image. This bit is also transmitted over the air interface. At the receiving side, CVSD decoder 332 creates the image with the received bit. Since the images at the sender and recipient are the same, and the image follows the input voice signal, the voice signal is recreated at the recipient. The bit transmitted represents a step size between the current voice value and the previous voice value. To avoid slope-overload in steep signal variations, the step size may be automatically adjusted (e.g., as by syllabic compounding).

Figure 4:
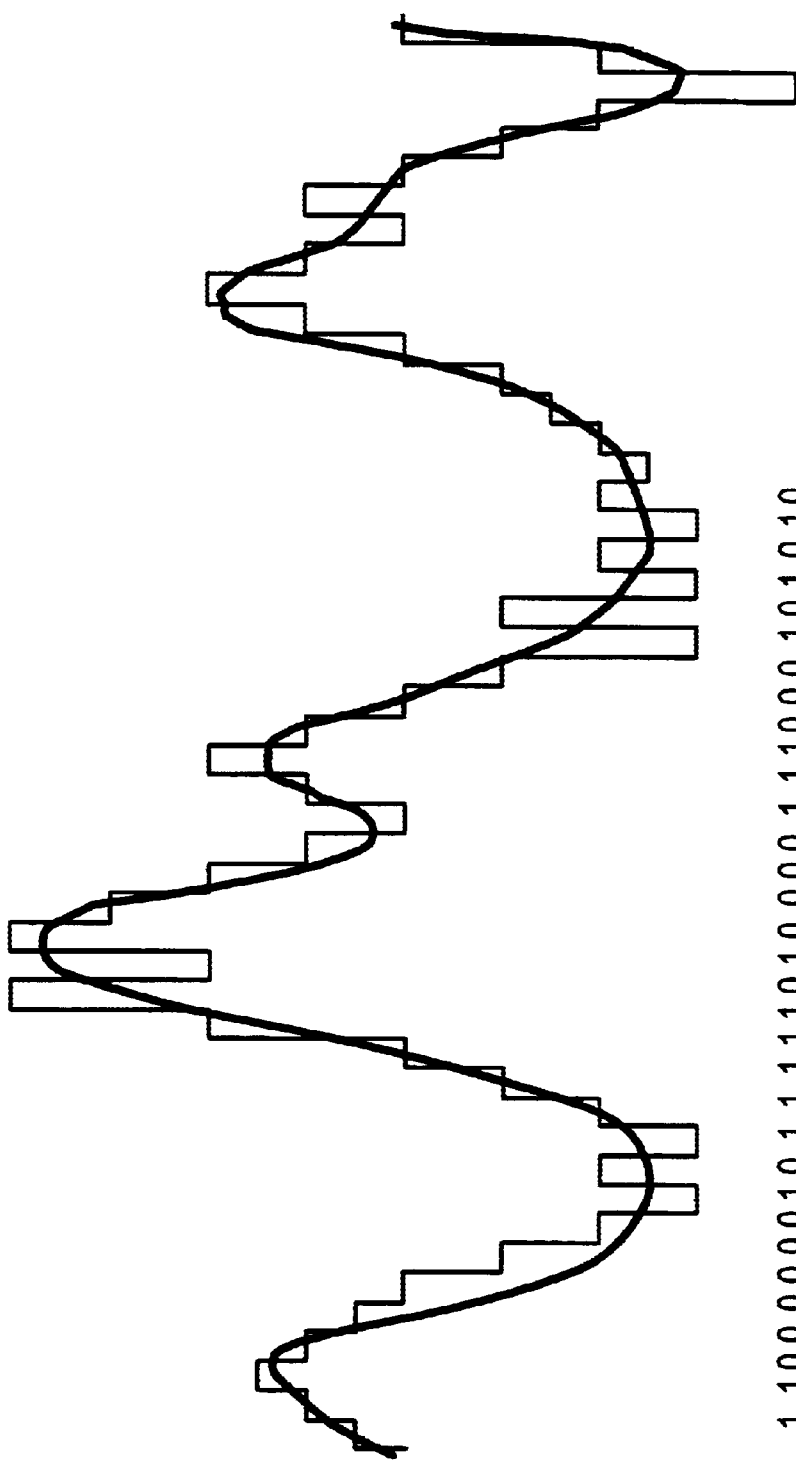
FIG. 4 is a schematic illustration of the CVSD encoding concept.

FIG. 4 is a schematic illustration of the operation of a CVSD encoder that illustrates how the CVSD image signal follows the analog input waveform. Referring to FIG. 4, it will be noted that the step size increases as the signal slope increases. CVSD encoding techniques are well-known in the communication arts. A description can for example be found in Jayant, N. S. and Noll, P., *Digital Coding of Waveforms* (Prentice-Hall, 1984), the disclosure of which is incorporated by reference.

Referring again to FIG. 3, the bit stream emerging from the CVSD encoder is segmented and packetized. The bit stream may be segmented using conventional segmenting (e.g., buffering) methods. In a preferred embodiment, the bit stream is divided into segments, the size of which corresponds to the payload size of the packets. For example, if the payload size is 240 bits, then the CVSD output stream is segmented into segments of 240 bits. Successive segments are then transmitted in successive packets. Radio transmitter 324 may include appropriate buffers for segmenting the data stream and packet-building circuitry for building packets for transmission. Alternatively, buffering and packet-building may be managed by a separate device disposed between CVSD encoder 314 and radio transmitter 324, which modulates a carrier signal and provides the modulated carrier to a suitable antenna.

The digital signal is received at radio receiver 330 and forwarded to CVSD decoder 332, which decompresses the signal in a known manner. The decompressed signal is the passed through Low Pass Filter (LPF) 338 that smooths the decoder output and reproduces an analog voice signal.

Figure 5:
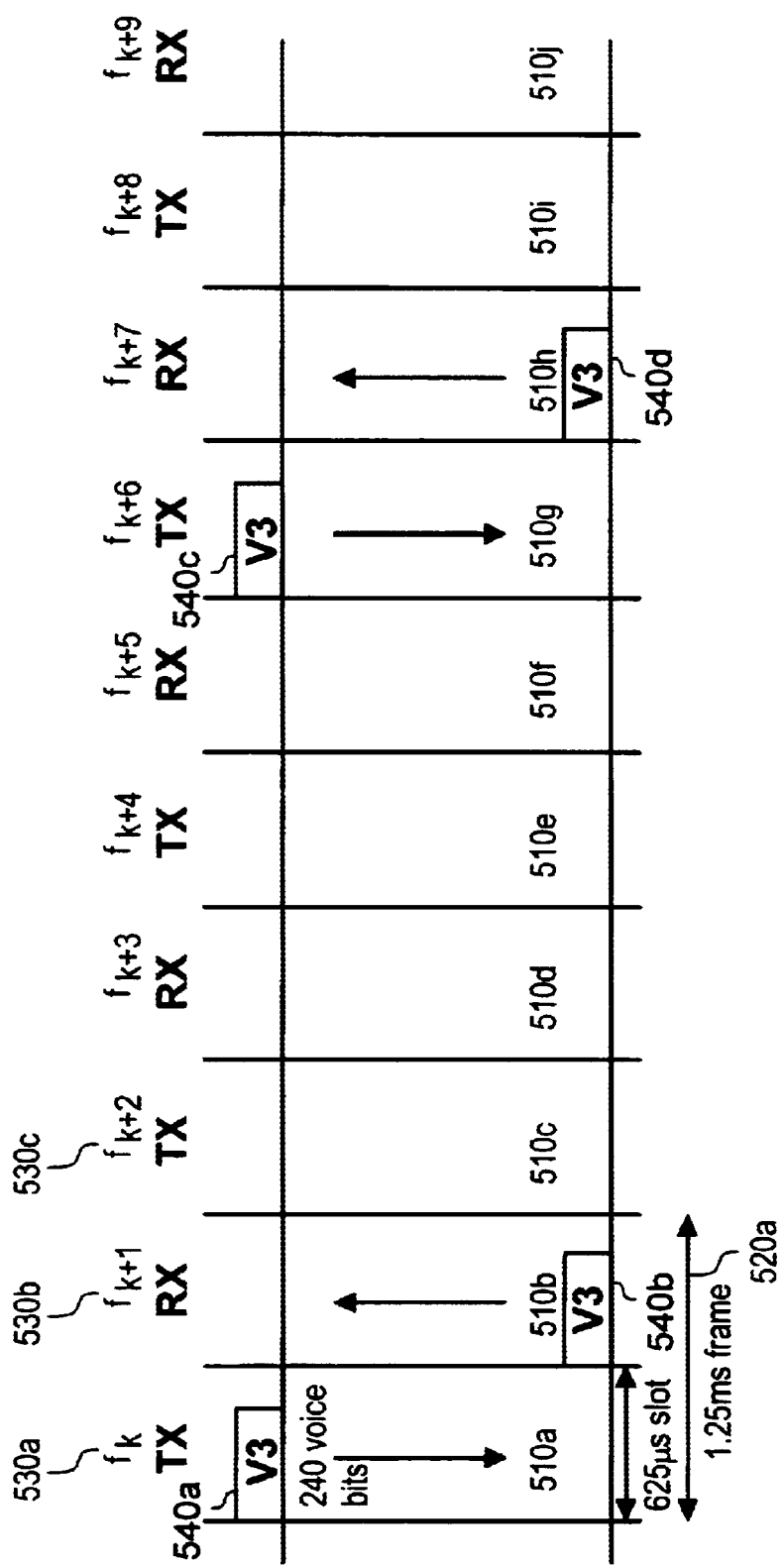
FIG. 5 is a schematic timing diagram illustrating an exemplary 64 kb/s voice transmission over a FH/TDD channel that does not implement FEC coding.

FIG. 5 is a schematic depiction of an exemplary 64 kb/s voice transmission over a FH/TDD channel that does not implement FEC coding. Referring to FIG. 5, it can be seen that using 240 user bits per packet and a time slot length of 625 µs (e.g., a full TDD frame with one forward and one return slot covers 1.25 ms), packets are transmitted in every third frame to support a voice rate of 64 kb/s. In particular, in time slot 510a packet 540a is transmitted and in time slot 510b packet 540b is transmitted in the opposite direction. In time slots 510c–510f no data is transmitted. In time slots 510g and 510h packets are exchanged, and during the next 4 time slots no transmission takes place. This process continues until the voice connection is released or the FEC coding is changed.

Several items should be noted in connection with FIG. 5. First, it will be noted that only one-third of the total link bandwidth, represented by slots 510*a*–510*b*, is required to support the 64 kb/s voice connection. The remaining two-thirds represented by time slots 510*c*–510*g* can be used to expand the capacity of the system (e.g., by adding other links) or to support other operations (e.g., paging, handoffs, etc.). The nomenclature V3 has been applied to packets 540*a*–540*d* to indicate that one frame out of three frames is used for the voice link.

Second, it should be noted that each packet of data transmitted represents 3.75 ms of voice information. Since each station transmits a packet every 3 frames, which corresponds to every 3.75 ms, the signal segment in each packet represents 3.75 ms of analog voice information. This analog voice information arrives at the input in a continuous stream, and buffers must be used to collect 3.75 ms of analog voice information before it can be applied to the air interface.

Figure 6:
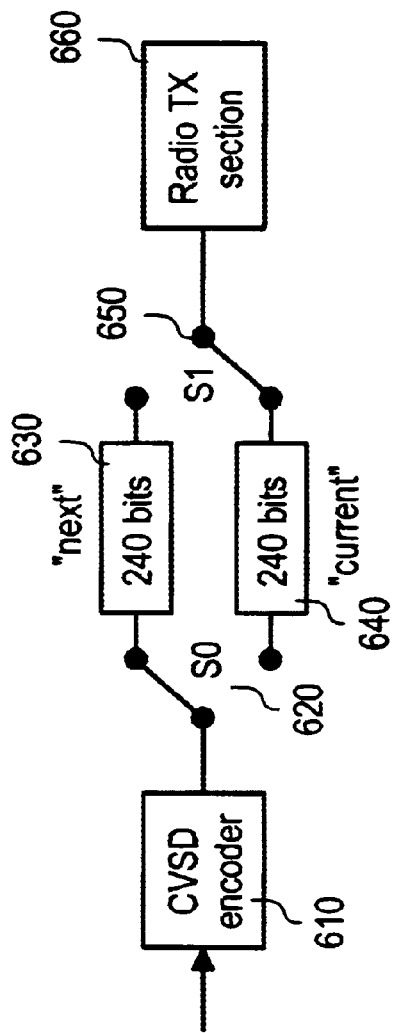
FIG. 6 is a schematic depiction of a system for buffering speech information for transmission over a FH/TDD channel that does not implement FEC coding.

FIG. 6 is a schematic depiction of a system for buffering speech information for transmission over a FH/TDD channel that does not implement FEC coding. In the system depicted in FIG. 3, buffering is preferably performed after CVSD encoder 314. Referring to FIG. 6, the buffering system includes parallel buffers 630 and 640 connected by switch 620 to CVSD encoder and by switch 650 to transmitter 660. Buffers 630, 640 preferably include sufficient memory to hold an amount of compressed voice information that, when combined with the FEC coding bits, equals the payload size of the packet transmitted of the link. In the example depicted in FIG. 3, buffers 630, 640 preferably are able to store 240 bits.

In operation, a data stream from CVSD encoder 610 is alternately directed to buffers 630, 640 by switch 620. The continuous incoming analog voice signal fills one of buffers 630, 640 continuously at a rate of 64 kb/s. Every 3.75 ms, one of buffers 630, 640 is read, packetized, and transmitted over the air interface by the radio transmit section. Buffer locations cannot simultaneously be filled by the encoder and emptied by the radio transmitter. To avoid contention problems, a "current" and "next" buffer scheme is applied in which the CVSD encoder fills the "next" buffer while the radio transmitter can read the "current" buffer. When a buffer is full, the "current" and "next" buffers change place (i.e., the switches S0 and S1 change place). It will be noted that while the "next" buffer is filled at a rate of 64 kb/s, the current buffer can be emptied at a higher rate by the TX section to be placed in the payload of a packet. It will be understood that buffering introduces a delay; voice data has to be collected before it can be placed in the payload of a packet. In the current example, this delay amounts to 3.75 ms. An additional delay (dT) may be introduced by the transmitter and receiver sections and other processes. The round-trip delay amounts to twice the one-way delay of 3.75 ms+dT, or 7.5 ms+2*dT.

Figure 7:
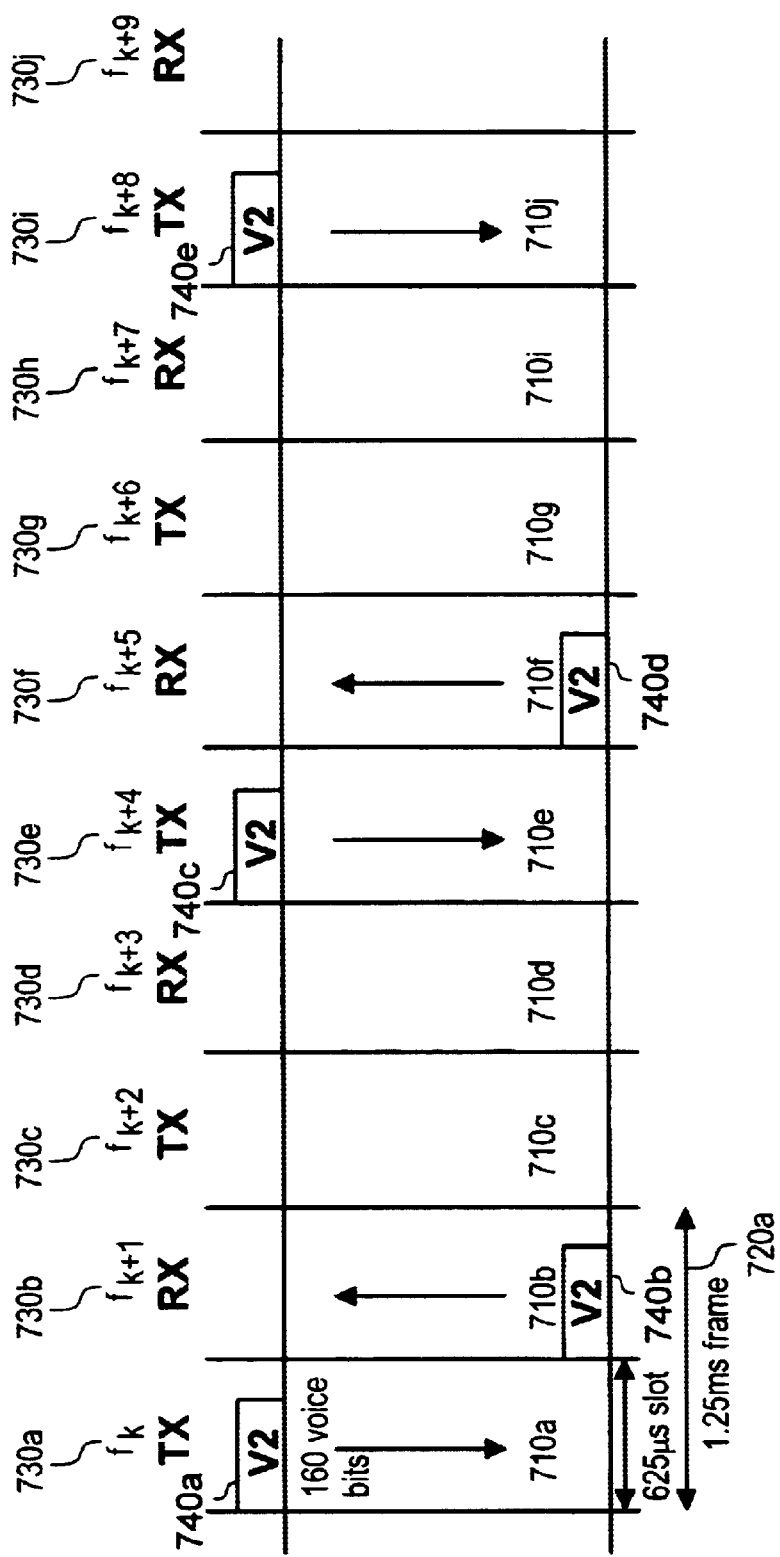
FIG. 7 is a schematic timing diagram illustrating an exemplary 64 kb/s voice transmission over a FH/TDD channel that implements FEC coding with a coding rate of 2/3.

FIG. 7 is a schematic depiction of an exemplary 64 kb/s voice transmission over a FH/TDD channel that implements FEC coding with a coding rate of 2/3. For example a (15,10) shortened Hamming code can be applied. When FEC coding is implemented with a 2/3 coding rate, the packet's 240 bit payload field includes 160 voice bits, and the remaining 80 bits are FEC bits. To carry the 64 kb/s user rate over the air interface, the transmitter must send one packet every two frames as illustrated in FIG. 7. In particular, in time slot 710*a* packet 740*a* is transmitted and in time slot 710*b* packet 740*b* is transmitted in the opposite direction. In time slots 710*c*–710*d* no data is transmitted. In time slots 710*e* and 710*f* packets are exchanged, and during the next 2 time slots no transmission takes place.

Several items should be noted in connection with FIG. 7. First, it will be noted that only fifty percent of the total link bandwidth, represented by slots 710*a*–710*b*, is required to support the 64 kb/s voice connection. The remaining fifty percent, represented by time slots 710*c*–710*d*, can be used to expand the capacity of the system (e.g., by adding other links) or to support other operations (e.g., paging, handoffs, etc.). The nomenclature V2 has been applied to packets 740*a*–740*e* to indicate that one frame out of two frames is used for the voice link.

Second, it should be noted that each packet of data transmitted represents 2.50 ms of voice information. Since each station transmits a packet every 2 frames, which corresponds to every 2.50 ms, the signal segment in each packet represents 2.50 ms of analog voice information. This analog voice information arrives at the input in a continuous stream, and buffers must be used to collect 2.50 ms of analog voice information before it can be applied to the air interface.

Figure 8:
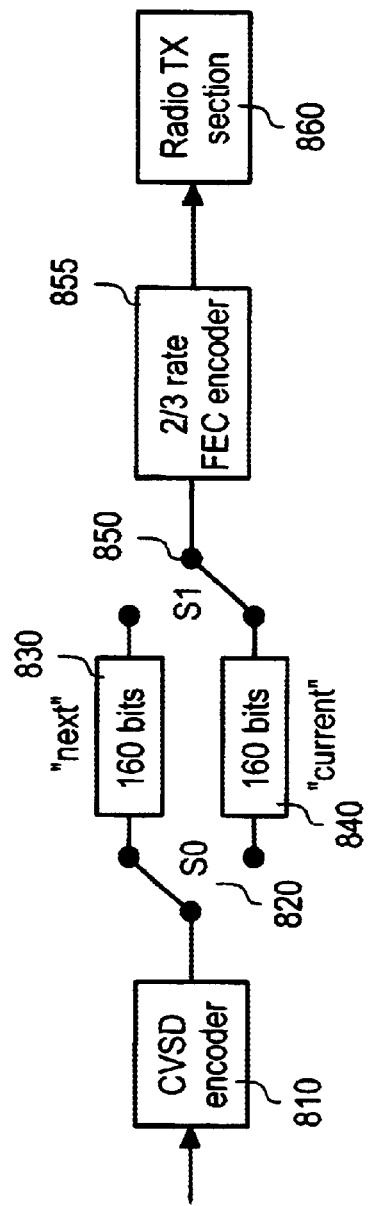
FIG. 8 is a schematic depiction of a system for buffering speech information for transmission over a FH/TDD channel that implements FEC coding with a coding rate of 2/3.

FIG. 8 is a schematic depiction of a system for buffering speech information for transmission over a FH/TDD channel that implements FEC coding with a coding rate of 2/3. In the system depicted in FIG. 3, buffering is preferably performed after CVSD encoder 314. Referring to FIG. 8, the buffering system includes a parallel buffers 830 and 840 connected by switch 820 to CVSD encoder 810 and by switch 850 to 2/3 rate FEC encoder 855 and to transmitter 860. Buffers 830, 840 preferably include sufficient memory to hold an amount compressed voice information that, when combined with the FEC coding bits, equals the payload size of the packet transmitted of the link. In the example depicted in FIG. 3, buffers 830, 840 preferably are able to store 160 bits.

In operation, the buffer depicted in FIG. 8 functions in substantially the same fashion as the buffer depicted in FIG. 6. A data stream from CVSD encoder 810 is alternately directed to buffers 830, 840 by switch 820. The continuous incoming analog voice signal fills one of buffers 830, 840 at a rate of 64 kb/s. Every 2.50 ms one of buffers 830, 840 is passed to FEC encoder 855, which adds an 80 bit FEC code, then read by the radio transmit section and packetized to be transmitted over the air interface. Buffers 830, 840 employ a "current" and "next" scheme to avoid contention problems. The buffering process depicted in FIG. 8 introduces a delay of 2.5 ms. An additional delay dT may be introduced by the transmitter and receiver sections and other processes. The round-trip delay amounts to twice the one-way delay of 2.5 ms+dT, or 5 ms+2*dT.

Figure 9:
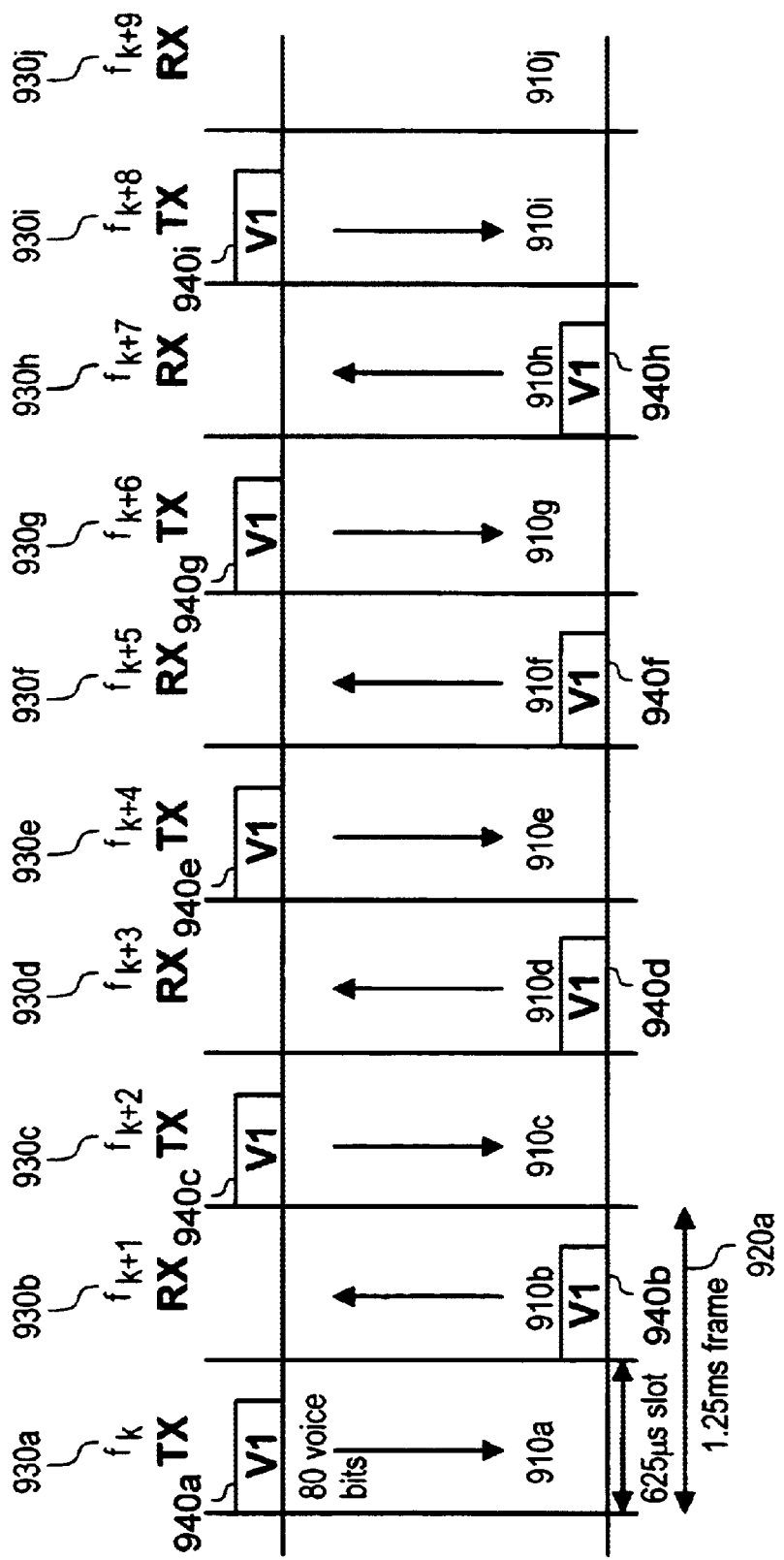
FIG. 9 is a schematic timing diagram illustrating an exemplary 64 kb/s voice transmission over a FH/TDD channel that implements FEC coding with a coding rate of 1/3.

FIG. 9 is a schematic depiction of an exemplary 64 kb/s voice transmission over a FH/TDD channel that implements FEC coding with a coding rate of 1/3. When FEC coding is implemented with a 1/3 coding rate, the packet's 240 bit payload field includes 80 voice bits, and the remaining 160 bits are FEC code bits. To carry the 64 kb/s user rate over the air interface, the transmitter must send a packet (e.g., 940*a*–940*i*) every frame as illustrated in FIG. 9.

It will be noted that the entire link bandwidth is required to support the 64 kb/s voice connection. The nomenclature V1 has been applied to packets 940*a*–940*i* to indicate that every frame must be used to support the voice link. It should also be noted that each packet of data transmitted represents 1.25 ms of voice information. Since each station transmits a packet every frame, which corresponds to every 1.25 ms, the signal segment in each packet represents 1.25 ms of analog voice information. This analog voice information arrives at the input in a continuous stream, and buffers must be used to collect 1.25 ms of analog voice information before it can be applied to the air interface.

Figure 10:
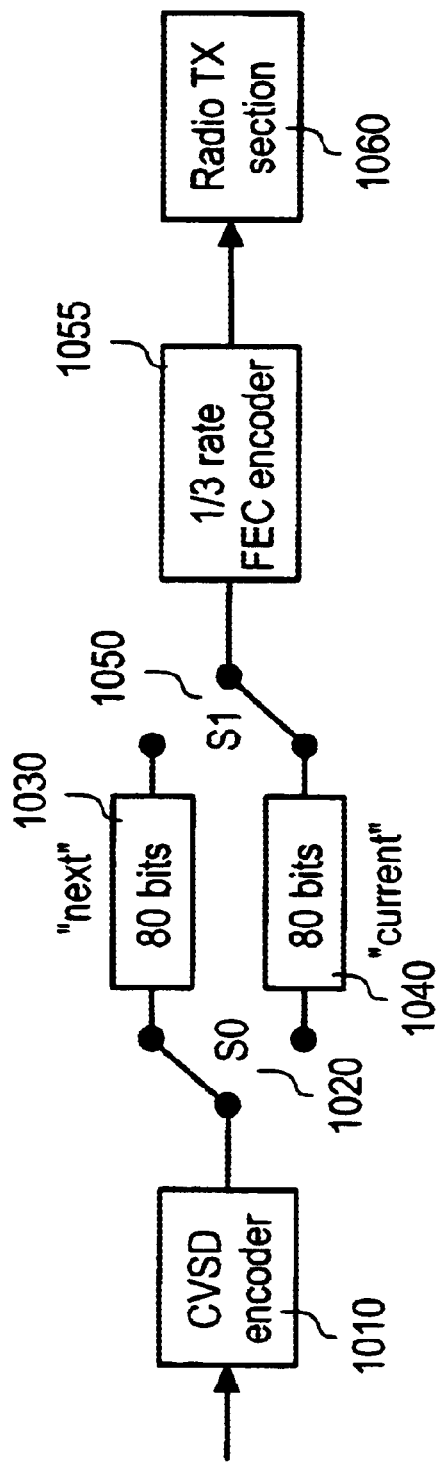
FIG. 10 is a schematic depiction of a system for buffering speech information for transmission over a FH/TDD channel that implements FEC coding with a coding rate of 1/3.

FIG. 10 is a schematic depiction of a system for buffering speech information for transmission over a FH/TDD channel that implements FEC coding with a coding rate of 1/3. In the system depicted in FIG. 3, buffering is preferably performed after CVSD encoder 314. Referring to FIG. 10, the buffering system includes parallel buffers 1030 and 1040 connected by switch 1020 to CVSD encoder 1010 and by switch 1050 to 1/3 rate FEC encoder 1055 and to transmitter 1060. Buffers 1030, 1040 preferably include sufficient memory to hold an amount compressed voice information that, when combined with the FEC coding bits, equals the payload size of the packet transmitted of the link. In the example depicted in FIG. 3, buffers 830, 840 preferably are able to store 80 bits.

In operation, the buffer depicted in FIG. 10 functions in substantially the same fashion as the buffers depicted in FIG. 6 and FIG. 8. A data stream from CVSD encoder 1010 is alternately directed to buffers 1030, 1040 by switch 1020. The continuous incoming analog voice signal fills one of buffers 1030, 1040 at a rate of 64 kb/s. Every 1.25 ms one of buffers 1030, 1040 is passed to FEC encoder 1055, which adds an 160 bit FEC code. The data stream is then read by the radio transmit section and packetized to be transmitted over the air interface. Buffers 1030, 1040 employ a "current" and "next" scheme to avoid contention problems. The buffering process depicted in FIG. 10 introduces a delay of 1.25 ms. An additional delay dT may be introduced by the transmitter and receiver sections and other processes. The round-trip delay amounts to twice the one-way delay of 1.25 ms+dT, or 2.5 ms+2*dT.

Summarizing, it will be apparent that adding extra FEC coding consumes more bandwidth on a link. Assuming a constant voice rate (e.g., 64 kb/s, in the above-described examples) and take the non-FEC coded case (V3 packet format) as a reference, then if a 2/3 rate coding (V2 packet type) is applied the required bandwidth increases by 50% and when 1/3 rate coding (V1 packet type) is applied the required bandwidth increases by 100%. At the same time, the delay can be reduced by a factor of 2/3 and 1/3, respectively, since packets have to be transmitted more frequently as the required bandwidth on a link increases.

As discussed above, it may be desirable to change the FEC coding scheme dynamically on an active communication link. In general, network operators prefer to maximize capacity in their networks. Thus, under normal operating conditions network operators generally prefer to implement the minimum amount of FEC coding required to provide satisfactory voice quality. Increasing the link bandwidth to increase FEC protection should be carried out only when required (e.g., when there is interference on the link). In other circumstances the amount of FEC coding applied to a link may have to be reduced temporarily to provide additional bandwidth to perform ancillary network operations on the link (e.g., paging, handoffs, etc.).

Figure 11:
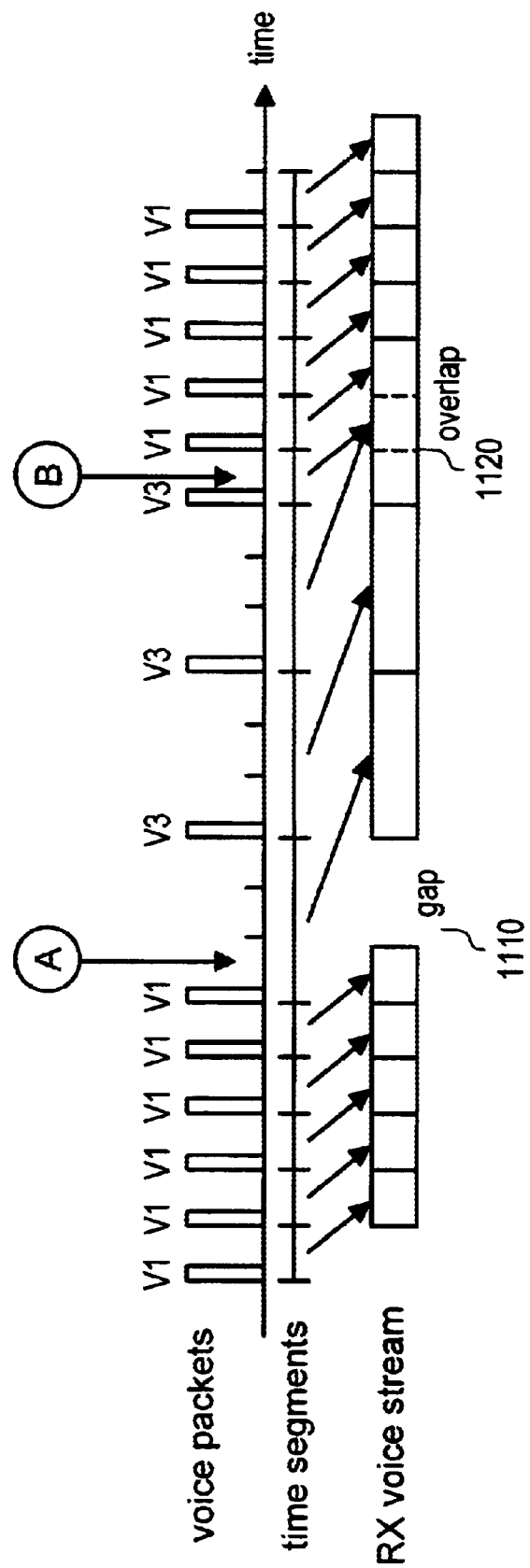
FIG. 11 is a schematic depiction of a data stream transmission illustrating delay variation in the received signal resulting from a change in the FEC encoding rate while communication link is active.

FIG. 11 is a schematic depiction of a data stream transmission in which the FEC encoding rate is dynamically changed from a packet type V1 (e.g., FEC error coding rate 2/3) to a packet type V3 (e.g., no FEC error coding) and back to packet type V1 while the channel is active. FIG. 11 represents the time slots only in one transmission direction; it will be appreciated that the transmission direction may be selected arbitrarily. Referring to FIG. 11, the transmission begins with packets of type V1 corresponding to FEC coding rate 2/3. It will be recalled that transmission of packet type V1 requires the entire bandwidth of the link to support a 64 kb/s voice transmission. Therefore, there is no bandwidth available on the link to increase system capacity or to perform ancillary network operations on the link.

At time point A, the packet type is changed from V1 to V3. This may be prompted by a need to free additional capacity for the system or to perform ancillary network operations on the link. The transition from a packet type V1, which has a delay of 1.25 ms, and type V3, which has a delay of 3.75 ms, results in a gap 1110 in the receipt of information in the receiver's data stream. Gap 1110 is undesirable as it may be audibly detectable to a user. At time point B, the packet type is changed from V3 to V1. This may be prompted by interference on the link which causes the system to implement additional FEC coding. The transition from packet type V3, which has a delay of 3.75 ms, to packet type V1, which has a delay of 1.25 ms, causes an overlap 1120 in the receipt of information in the receiver's data stream. Overlap 1120 is also undesirable as it may be audibly detectable to a user.

Figure 12:
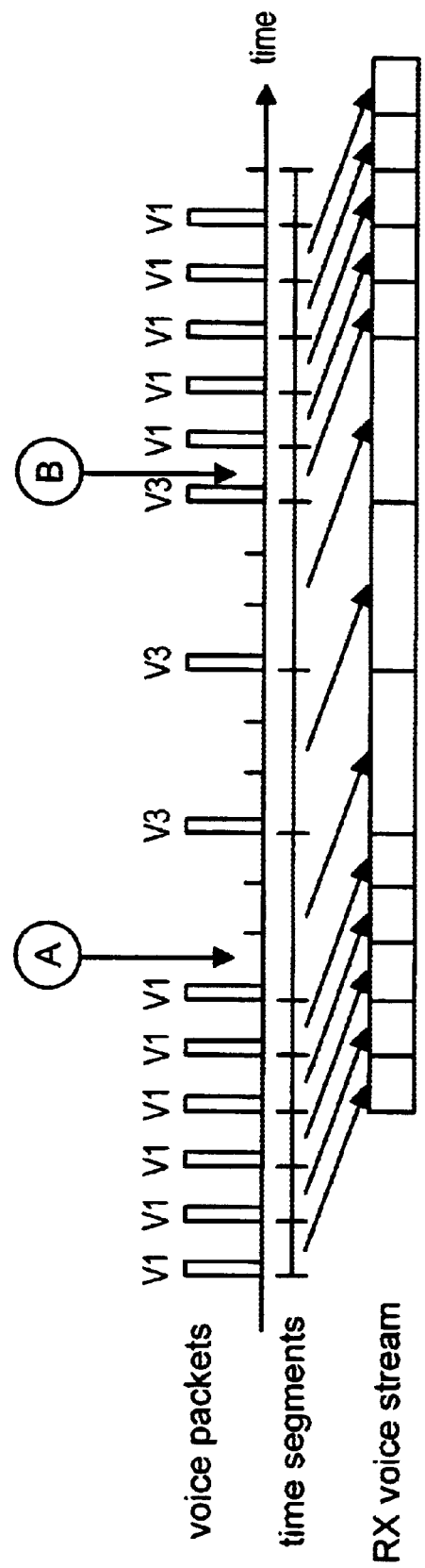
FIG. 12 is a schematic illustration of a data stream transmission in which the delay is held constant while the FEC coding rate is changed.

FIG. 12 is a schematic illustration of a data stream transmission depicting one method of eliminating gap 1110 and overlap 1120 in the voice transmission illustrated in FIG. 11. Referring to FIG. 12, additional delay may be introduced in the buffers for the V1 and V2 packet formats such that the total delay is fixed at 3.75 ms. Using a constant buffering scheme eliminates changes in the delay in transmission over the air interface. Therefore, neither gaps nor overlaps in the voice stream occur. However, this solution establishes a minimum round-trip delay of 7.5 ms. Delays accumulate and any additional links should add as little delay as possible. Preferably, the system's round-trip delay should be minimized. If the delay becomes excessive, echoes can cause problems on the link, especially when this air interface is in tandem with another air interface like for example GSM.

Another method of eliminating gap 1110 and overlap 1120 is to change the delay on demand, preferably at times not noticeable to the listener such as, for example, when there is no voice transmission over the link. It is known that a spoken sentence consists of about forty percent silent periods. Wireless systems may exploit these silent periods by using a voice-activity detector (VOD) at the transmitter to monitor the energy level of the voice signal and withhold transmission of information during periods of silence. This process is commonly referred to as Discontinuous Transmission or DTX. In one aspect, the present invention contemplates carrying out the shifts in delay during silent periods, if possible. While it cannot be guaranteed that switch points A and B as shown in FIG. 11 coincide with periods of silence, in practice switch points A and B are frequently known well in advance, and the system can increase the delay during a silence periods occurring at a point in time before switch point A. Similarly, it can reduce the delay during a silent periods at a point in time after switch point B. Delay variations that occur during periods of silence are not easily detectable by users of the system.

Figure 13:
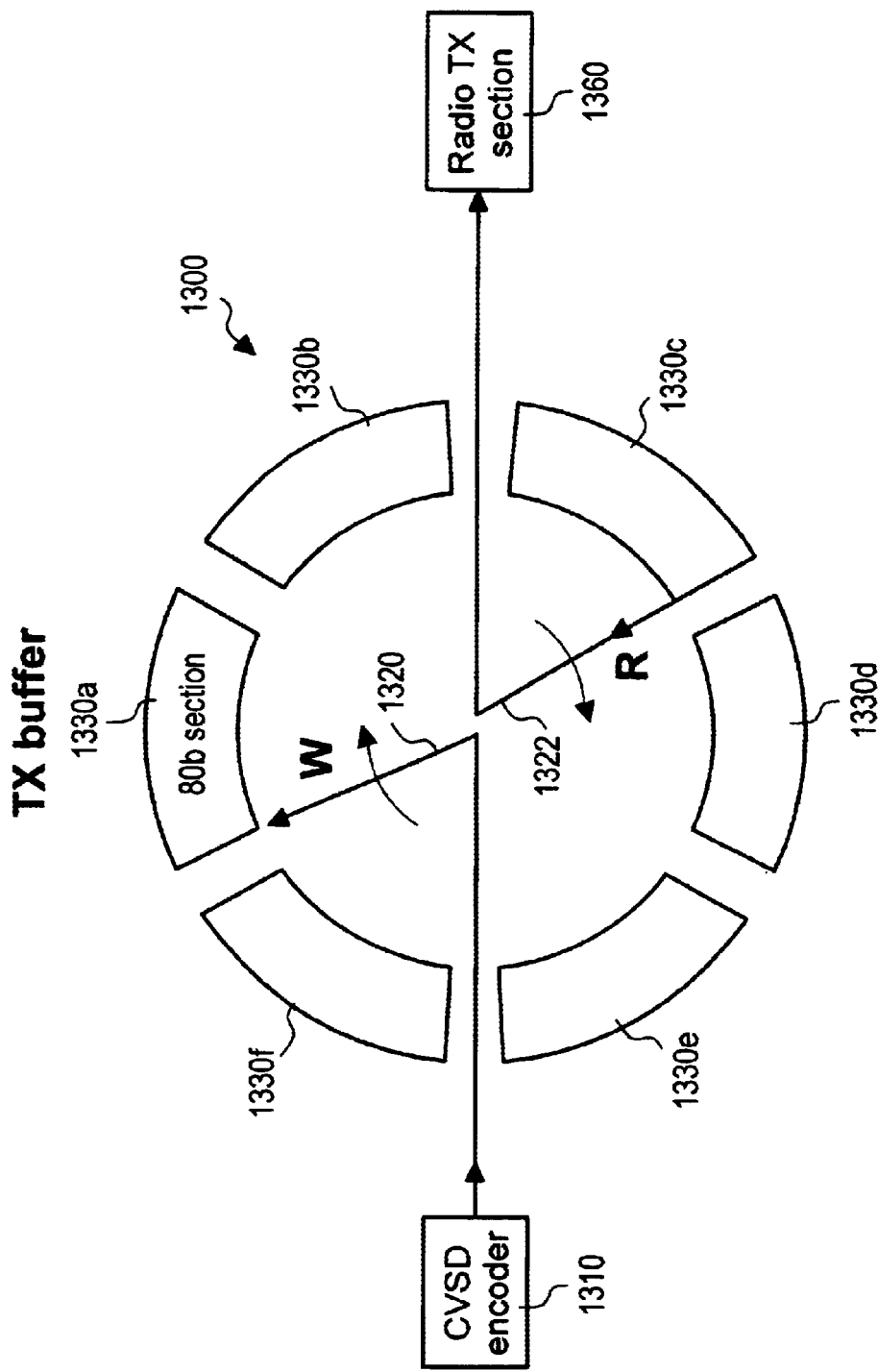
FIG. 13 is a schematic illustration of a transmission ring buffer having independent sections according to an embodiment present invention.

FIG. 13 illustrates a novel transmission ring buffer according to an embodiment of the present invention. Referring to FIG. 13, a transmission ring buffer 1300 with a total length of 480 bits is disposed between a CVSD encoder 1310 and a radio transmitter section 1360. In the system depicted in FIG. 3, transmission ring buffer 1300 is preferably disposed between CVSD encoder 314 and radio transmitter 324. Transmission ring buffer 1300 includes six independent sections 1330a–1330f. Each buffer section 1330a–1330f contains 80 bits of memory, which store 1.25 ms worth of compressed voice information, assuming a 64 kb/s voice rate. Each buffer section 1330a–1330f may be written to and read, but not at the same time. Writing to buffers 1330a–1330f is represented by the W pointer 1320 and reading from buffers is represented by the R pointer 1322. Conceptually, W pointer 1320 and R pointer 1322 rotate in the same direction (e.g., in a clock-wise rotation). Transmission buffer 1300 may be used in the place of any of the alternating buffer schemes depicted in FIG. 6, FIG. 8, or FIG. 10.

In operation, W pointer 1320 continuously writes one bit of digitized voice information in each memory location at a rate equal to the output rate of the CVSD encoder 1310, which typically approximates the voice rate (e.g., 64 kb/s). After 80 bits are written, W pointer 1320 advances to the next buffer section. R pointer 1322 reads one bit from each memory location. After 80 bits are read, R pointer 1322 jumps one buffer section. Reading may be accomplished in batch mode. When a packet is ready to be transmitted, the buffer section(s) can be read at a rate controlled by the packet builder in the radio transmission section 1360 (which may also include the FEC encoder, not shown) in order to fill the payload section of the packet. Contention problems are avoided by restricting pointers W pointer 1320 and R pointer 1322 from pointing to the same buffer section. In transmission buffer 1300, R pointer 1322 always lags behind W 1320.

Figure 14C:
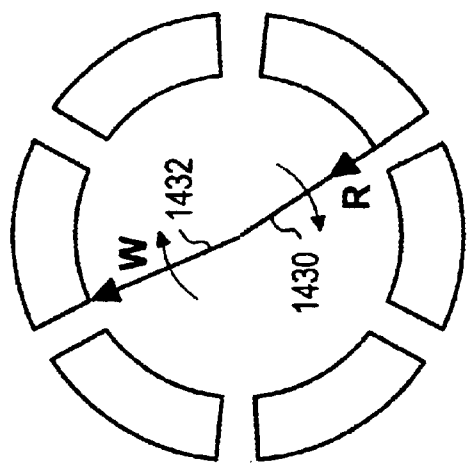
FIG. 14(c) is a schematic depiction of the ring buffer of FIG. 13 illustrating the relative positions of W and R pointers for a 3.75 ms delay.
Figure 14B:
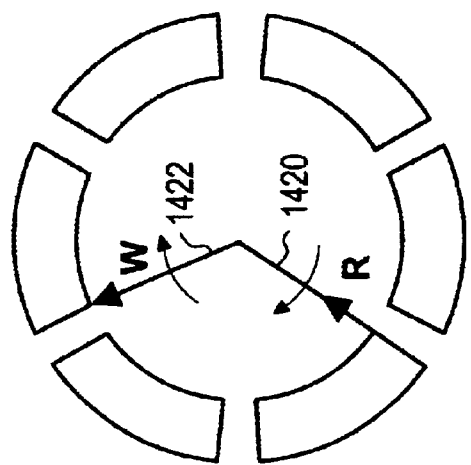
FIG. 14(b) is a schematic depiction of the ring buffer of FIG. 13 illustrating the relative positions of W and R pointers for a 2.5 ms delay.
Figure 14A:
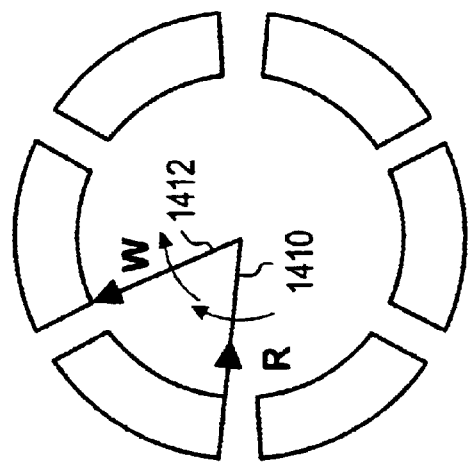
FIG. 14(a) is a schematic depiction of the ring buffer of FIG. 13 illustrating the relative positions of W and R pointers for a 1.25 ms delay.

FIGS. 14a–14c illustrate the relative positions of write and read pointers in a transmission buffer for various delays. In FIG. 14(a), R pointer 1410 lags W pointer 1412 by one buffer section, representing a delay of 1.25 ms. This relative position can only be used for V1 packet types. In FIG. 14(b), R pointer 1420 lags W pointer 1422 by two buffer sections, representing a delay of 2.5 ms. This relative position can be used for the V2 type packets and for V1 type packets. It will be noted that in this case V1 type packets will have a longer delay than necessary. In FIG. 14(c), R pointer 1430 lags W pointer 1432 by three buffer sections, representing a delay of 3.75 ms. This relative position is mandatory for V3 packet types, but can also be used in case of the V2 or V1 packet types. It will be noted that the absolute position of the pointers is not important, but their positions relative to each other is important.

Figure 15:
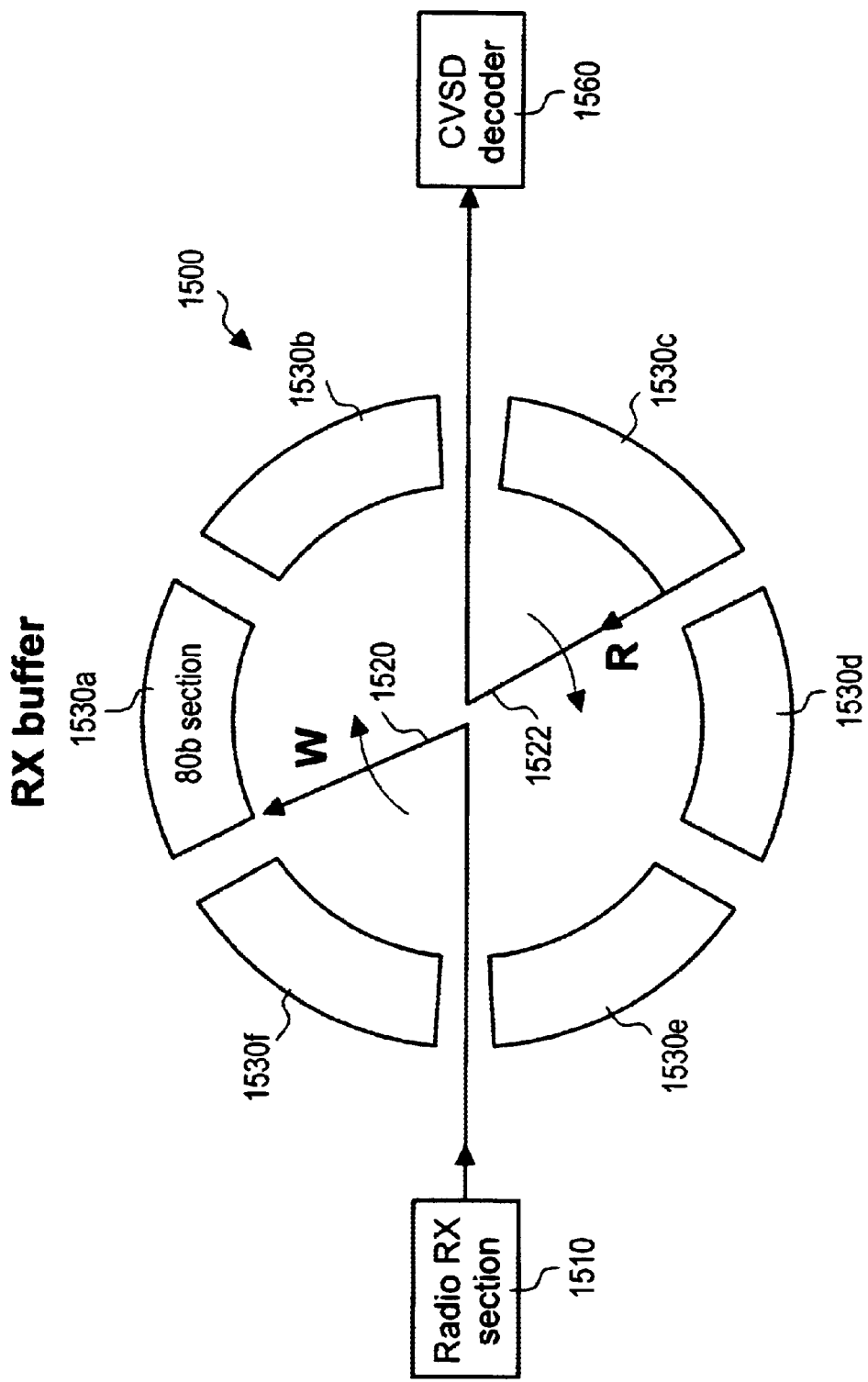
FIG. 15 is a schematic illustration of a receiver ring buffer having independent sections according to an embodiment of the present invention.

FIG. 15 is a schematic illustration of a novel receiver ring buffer 1500 according to an embodiment of the present invention. Referring to FIG. 15, a receiver (RX) ring buffer 1500 with a total length of 480 bits is disposed between a radio receiver section 1510 and a CVSD decoder 1560. Referring to the system depicted in FIG. 3, ring buffer 1500 is preferably disposed between radio receiver 330 and CVSD decoder 332. Conceptually, ring buffer 1500 works in a manner similar to ring buffer 1300. However, in receiver ring buffer 1500, W Pointer 1520 is controlled by the radio RX section and can write at a high data rate, whereas the R pointer 1522 is controlled by CVSD decoder 1560 and reads at a constant rate equal to the voice rate (e.g., 64 kb/s).

The following examples illustrate the operation of the adaptable ring buffers 1300, 1500. First, assuming a fixed delay of 3.75 ms for each packet type, R pointer 1322 lags W pointer 1320 by 3 buffer sections, as illustrated in FIG. 14c. The number of buffer sections the R pointer 1322 reads at one time depends on the packet type used: one buffer section for V1 packet type, two buffer sections for V2 packet types, and three buffer sections for V3 packet types. Likewise, in receiver buffer 1500 at the recipient, R pointer 1522 lags W pointer 1520 by three pointer sections. Depending on the packet type used, W pointer 1320 and R pointer 1522 are controlled to provide the proper conversion from the continuous voice stream to a packetized data stream and back to a continuous voice stream.

Each of the ring buffers depicted in FIGS. 13–15 includes six discrete sections, each holding 80 bits of data, which corresponds to 1.25 ms of voice information a 64 kb/s sampling system. In the communication systems depicted in FIGS. 5–12, 1.25 ms represents the delay resolution of the system (e.g., the smallest delay the system can implement). More generally, it is desirable that the amount of data held by each independent section of a ring buffer represents an amount of time equal to the delay resolution of the system. It will be appreciated that the size of each discrete memory section may vary in alternate embodiments of the present invention, depending upon system variables including, the voice sampling rate, the length of the time slot, the payload size of the packet, and the FEC encoding schemes implemented in the system. One of ordinary skill in the art is capable of determining the delay resolution of a communication system when provided with the relevant parameters.

Figure 16:
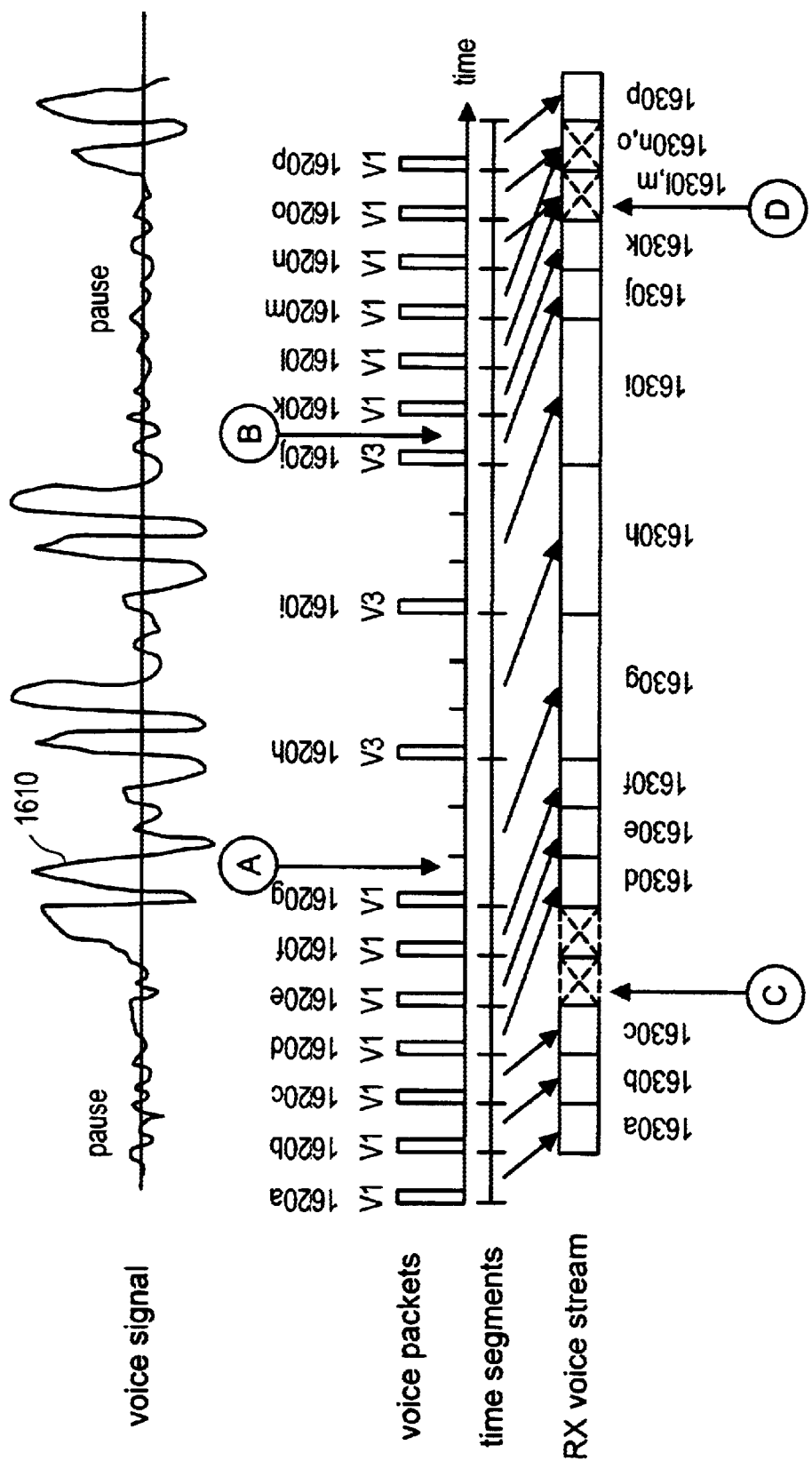
FIG. 16 is a schematic illustration of an exemplary delay variation and change of packet type according to one embodiment of the current invention.

FIG. 16 is a schematic depiction of a data stream transmission in which the FEC encoding rate is dynamically changed from a packet type V1 (e.g., FEC error coding rate 2/3) to a packet type V3 (e.g., no FEC error coding) at switch point A and back to packet type V1 at switch point B while the channel is active. Referring to FIG. 16, analog voice signal 1610 is illustrated on a first time-line. Digitized voice packets 1620a–1620p are illustrated on a separate time line. Finally the received voice stream packets 1630a–1630p are illustrated on a third time line. The communication session begins with the transmission of packets of type V1, corresponding to FEC coding rate 2/3. It will be recalled that transmission of packet type V1 results in a delay of 1.25 ms and requires the entire bandwidth of the link to support a 64 kb/s voice transmission. Therefore, there is no bandwidth available on the link to increase system bandwidth or to perform ancillary network operations on the link.

At time point A it is desired to change the packet type from V1 to V3. This may be motivated by a desire to free additional capacity for the system or to perform ancillary network operations on the link. According to the present invention, the delay may be increased from 1.25 ms to 3.75 ms by advancing the position of W pointer 1320 in transmission buffer 1300 (compare FIG. 14(a) with FIG. 14(c)). In a preferred embodiment, the transmitter includes a VOD to detect when there is no voice input to the transmitter and the delay is increased at such time. Referring to FIG. 16, there is substantially no voice input at time point C. Advancing the position of W pointer 1320 at time point C causes W pointer to skip over two buffer sections. The skipped buffers are represented by the two sections between received packet 1630c and 1630d marked with an "X". If DTX is applied, the contents of these buffer sections are not transmitted over the air interface, so their contents are irrelevant. If DTX is not applied, then the information in the two buffers skipped by W pointer 1320 is transmitted over the air interface when read by R pointer 1322. If W pointer 1320 is advanced during a silent period, then the voice information transmitted in the two skipped sections will not be audibly detectable to the user. If desired, the contents of the buffers may be initialized with a digital noise signal (e.g. 0101010 . . . in CVSD) to ensure that the transmitted signal is inaudible.

As illustrated in FIG. 16, after the delay shift has been implemented at point C, the transmitter can change from packet type V1 to packet type V3 at point A without introducing a delay variation. Since a delay of 3.75 ms was already introduced prior to point A, a V3 packet can follow a V1 packet directly and no delay change takes place.

In the receiver buffer 1500, W pointer 1520 is controlled by the packet type. W pointer 1520 advances only when a packet arrives. In one embodiment of the invention, packet header 220 (FIG. 2) includes is an indication of whether packet 200 is a V1, V2 or V3 packet. Packet header 220 may be interpreted by logic in the receiver. When a V1 packet arrives, W pointer 1520 is restricted to write only in one buffer section. When a V2 packet arrives, W pointer 1520 is allowed to write in one or two buffer sections. And when a V3 packet arrives, W pointer 1520 is allowed to write in one, two, or three buffer sections. By contrast, R pointer 1522 is controlled with a continuous speed of 64 kb/s. During the change of packet type at point A, there are no discontinuities in the voice stream and there is no perceived degradation to the listener.

At time point B, it is desired to change from packet type V3 back to packet type V1. The packet type is changed at time point B, but transmission buffer 1300 maintains a delay of 3.75 ms. It will be noted that W pointer 1520 in the receiver buffer 1500 adjusts automatically based on the packet type indication in the packet header. Thus, when the first packet of type V1 is received (e.g., packet 1620k), W pointer 1520 is restricted to write in a single buffer section. After the packet type is changed back to V1, it may be desired to reduce the delay on the link. FIG. 16 illustrates reducing the delay from 3.75 ms, as required by packet type V3 to 1.25 ms, the minimal delay condition. Again, in a preferred embodiment of the invention, a VOD in the transmitter detects when there is no voice input and the delay is increased at such time. To implement a delay shift from 3.75 ms to 1.25 ms, W pointer 1320 in transmission buffer 1300 is moved back by two buffer sections. It is noted that this causes W pointer 1320 to overwrite information buffered for transmission. Again, if the transmitter implements DTX, the contents of these buffer sections are not transmitted over the air interface, so overwriting their contents is not relevant. If DTX is not applied, then the information in the two buffers rewritten by W pointer 1320 is retransmitted over the air interface. If W pointer 1320 is moved during a silent period, then the voice information retransmitted in the two overwritten sections will not be audibly detectable to the user.

Several aspects of the present invention should be noted. First, packet type changes and preparation for delay changes only have to be implemented in the transmission buffer; the receiver buffer adjusts automatically in response to the change in packet type. Second, changes in packet types and buffer delays can be carried out independently on the forward and reverse link. Preferably, both links use the same packet type to exploit the bandwidth increase in the time window between points A and B. In one embodiment of the invention one transmitter acts as a master that makes the decision to change the packet type and the other transmitter follows as a slave, always responding with a packet of the same type. Third, the delay shifts in the master transmitter and the slave transmitter do not have to be synchronized. As long as both the transmitters have increased the delay to 3.75 ms at a point in time prior to point A, there will not be a problem. In the communication link depicted in FIG. 16, the round-trip delay changes from 2.5 ms (1.25+1.25 ms) in the beginning, to 5 ms (e.g., 3.75 ms+1.25 ms) when only one has shifted, to 7.5 ms just before point A and during the period between point A and B, then back to 5 ms and to 2.5 ms.

Adaptive ring buffers 1300, 1500 can also be used to affect positive or negative time shifts on the communication link. This feature may be used to synchronize different independent radio links. The size of ring buffers 1300, 1500 preferably is twice the longest segment to be transmitted over the link. It will be noted that increasing the number of compression bits increases the size of the buffer segments. The resolution of the delay is determined by the size of a buffer section, $L_{section}$, which, in turn, is related to the time frame length $T_F$ and the voice rate $R_{voice}$ as follows:

$$L_{section} = T_F * R_{voice} \text{bits}$$

Figure 17:
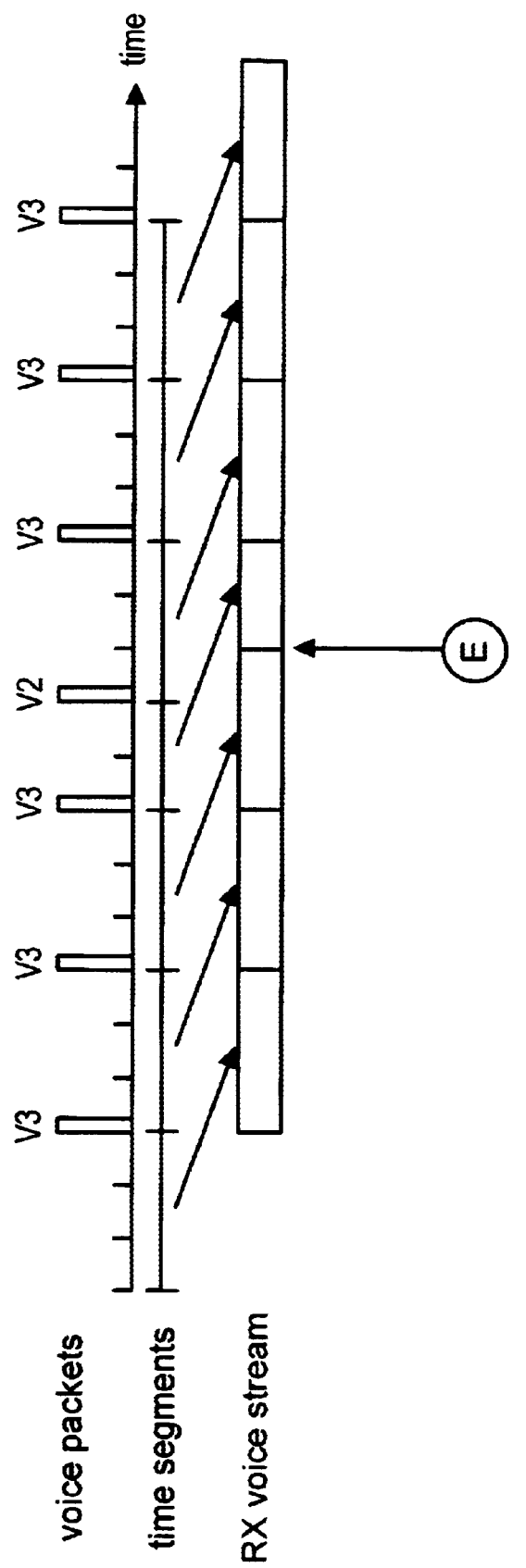
FIG. 17 is a schematic illustration of an exemplary negative shift in time slots according to one embodiment of the present invention.
Figure 18:
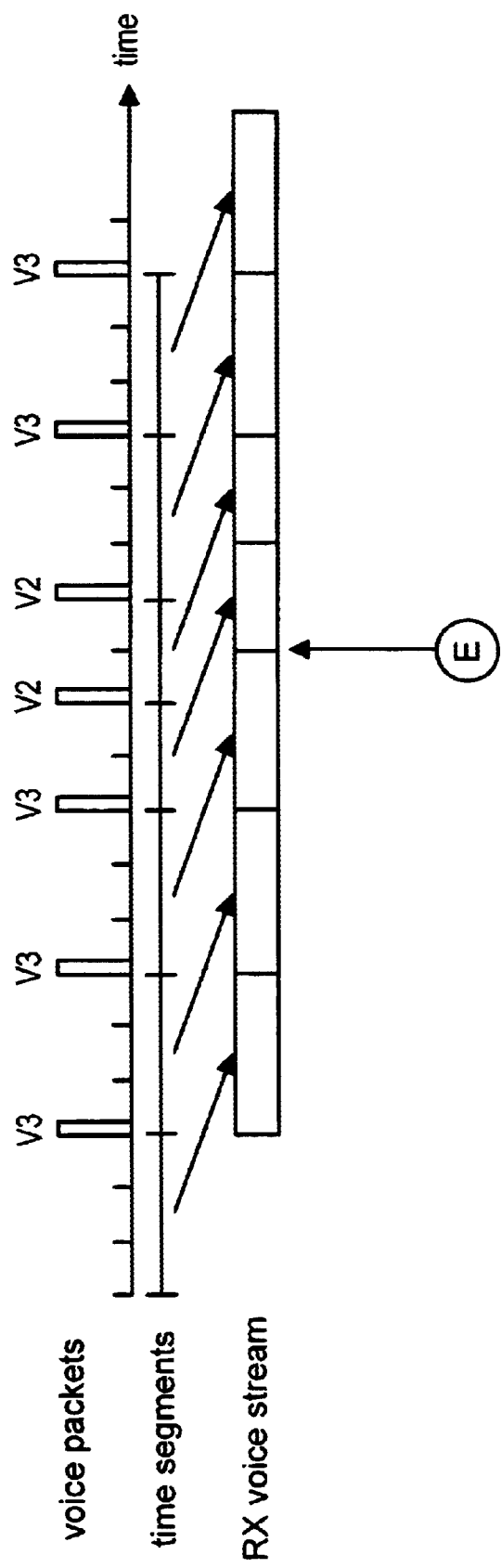
FIG. 18 is a schematic illustration of an exemplary positive shift in time slots according to one embodiment of the present invention.

FIG. 17 is a schematic illustration of an exemplary negative shift in time slots according to one embodiment of the present invention. Referring to FIG. 17, a voice link is implemented using packets of type V3. To advance the link timing by one slot, R pointer 1322 is advanced 2 buffer sections (instead of 3) and a V2 packet is transmitted. When the recipient receives a V2 packet, W pointer 1520 is advanced 2 sections, rather than three. Referring to time point E, however, it will be noted that the delay during the V2 packet is still 3.75 ms. Transmitting a single V2 packet, rather than a V3 packet, effects a negative time shift of one frame. To accomplish a positive time shift of one frame, two V2 packet may transmitted instead of one V3 packet, as illustrated in FIG. 18.

In the foregoing description, a constant voice coding rate was applied and delay variations were introduced by variations in the FEC coding rate. However, it will be appreciated that delay variations may be introduced by changes in the voice coding rate. By way of example, when the voice coding rate decreases more information is compressed and more speech may be packed into one packet. This results in an increase in the interval between the packets and thus in a variation of the delay. Delay variations caused by changes in the voice coding rate can be addressed using the same techniques described above.

The present invention is described above with reference to particular embodiments, and it will be readily apparent to those skilled in the art that it is possible to embody the invention in forms other than those described above. The particular embodiments described above are merely illustrative and should not be considered restrictive in any way. The scope of the invention is determined given by the following claims, and all variations and equivalents that fall within the range of the claims are intended to be embraced therein.

What is claimed is:

1. A transmitter for a communication system, comprising:
    a sampler for sampling analog voice information at a predetermined sampling rate;
    a digitizer for converting the analog voice information to digital data representative of the analog voice information;
    an encoder for compressing the digital data according to a selected one of a plurality of unit coding rates, the selected one of the plurality of unit coding rates dynamically changing according to communication system demands, wherein changing from a first unit coding rate to a second, higher, unit coding rate results in a higher than minimal end-to-end delay over the communication link;
    a ring buffer system for buffering the compressed digital data in the form of data packet payloads of a predetermined size, the ring buffer system comprising a plurality of independent memory sections each sized to store one data packet payload, each respective stored data packet payload being read from the buffer after a unit time delay with respect to when the data packet payload was stored, the unit time delay being adjusted in cooperation with the encoder to reduce the higher than minimal end-to-end delay caused by the change in the selected unit coding rate; and a transmitter section for transmitting the read payloads within packets across a communication link.

2. A transmitter according to claim 1, wherein: the predetermined sampling rate is 64 kb/s.

3. A transmitter according to claim 1, wherein: the encoder compresses data according to a compression algorithm selected from the group of compression algorithms consisting of CVSD, V-CELP and RPE-LTP.

4. A transmitter according to claim 1, wherein: the transmitter section includes packet-building circuitry for assembling packets for transmission.

5. A transmitter according to claim 1, wherein the ring buffer system comprises:

a write pointer for determining a memory location into which the digital data is buffered; and a read pointer for determining the memory location from which the buffered digital data is read from memory for transmission across the communication link, wherein a delay over the communication link may be adjusted by changing the relative positions of the write pointer and the read pointer.

6. The transmitter of claim 1, wherein the transmitter further includes a voice activity detector to detect a voice input and the compensation of end-to-end delay variation by the ring buffer system is performed selectively according to the detection of the voice input by the voice activity detector.

7. A transmitter according to claim 1, wherein: the unit time delay is an integer multiple of 1.25 ms; and each independent memory section is sized to hold 1.25 ms of the analog voice information.

8. A receiver for a communication system, comprising:

a receiver section for receiving packets from a communication link, the packets having been encoded by an encoder according to a selected one of a plurality of unit coding rates, the selected one of the plurality of unit coding rates dynamically changing according to communication system demands, wherein changing from a first unit coding rate to a second, higher, unit coding rate results in a higher than minimal end-to-end delay over the communication link;

a ring buffer system for buffering the data packets, the ring buffer system comprising a plurality of independent memory sections each sized to store one data packet, each respective stored data packet being read from the buffer after a unit time delay with respect to when the data packet payload was stored, the unit time delay being adjusted in cooperation with the encoder to reduce the higher than minimal end-to-end delay caused by the change in the selected unit coding rate; and a decoder for decompressing the read data packets.

9. A receiver according to claim 8, further comprising: means for converting the decompressed digital data into an analog voice signal.

10. A receiver according to claim 8, wherein: the decoder compresses data according to a compression algorithm selected from the group of compression algorithms consisting of CVSD, V-CELP and RPE-LTP.

11. The receiver of claim 8, wherein the receiver further includes a voice activity detector to detect a voice input and the compensation of end-to-end delay variation by the ring buffer system is performed selectively according to the detection of the voice input by the voice activity detector.

12. A receiver according to claim 8, wherein: the unit time delay is an integer multiple of 1.25 ms; and each independent memory section is sized to hold 1.25 ms of voice information.

13. A method of operating a communication system, comprising the steps of:

sampling analog voice information at a predetermined sampling rate;

converting the analog voice information to digital data representative of the analog voice information;

compressing the digital data according to a selected one of a plurality of unit coding rates, wherein the selected coding rate of the compressed digital data dynamically changes according to communication system demands, wherein changing from a first unit coding rate to a second, higher, unit coding rate results in a higher than minimal end-to-end delay over the communication link;

storing the compressed digital data in a ring buffer system in one of a plurality of independent memory sections each sized to store one data packet payload, each respective stored data packet payload being read from the buffer after a unit time delay with respect to when the data packet payload was stored, the unit time delay being adjusted to reduce the higher than minimal end-to-end delay caused by the change in the selected unit coding rate;

packetizing the compressed digital data for transmission across a communication link; and transmitting packets across the communication link having said end-to-end delay.

14. A method according to claim 13, further comprising the steps of:

receiving the packets from a communication link;

extracting the digital data from the received packets;

buffering a predetermined amount of the digital data received from the communication link in a ring buffer to compensate for the predetermined variation in an end-to-end delay caused by the changing of the coding rate; and decompressing the digital data.

15. The method of claim 13, wherein the step of storing further includes detecting a voice input using a voice activity detector and the compensation of end-to-end delay variation by the ring buffer system is performed selectively according to the detection of the voice input by the voice activity detector.

16. In a telecommunication system comprising ring buffers at a transmitter and receiver for storing digital data representative of voice information, a method of compensating for variations in the delay over an active communication link caused by changes in an encoding rate of the digital data, wherein changing from a first unit encoding rate to a second, higher, unit encoding rate results in a higher than minimal end-to-end delay over the communication link, comprising the steps of:

monitoring voice information at the transmitter to detect a silent period; and during a silent period, changing the relative position of the transmitter ring buffer's read pointer and write pointer, wherein the compressed digital data is stored in the transmitter ring buffer in one of a plurality of independent memory sections each sized to store one data packet payload, each respective stored data packet payload being read from the buffer after a time delay according to the relative position of the transmitter ring buffer's read pointer and write pointer, the time delay being adjusted to reduce the higher than minimal end-to-end delay caused by the change in the selected encoding rate.

17. The method of claim 16, wherein the step of changing the relative position of the transmitter's read pointer and write pointer comprises:

reducing the separation between the transmitter's write pointer and the transmitter's read pointer to reduce the delay over the link.

18. The method of claim 16, wherein the step of changing the relative position of the transmitter's read pointer and write pointer comprises:

increasing the separation between the transmitter's write pointer and the transmitter's read pointer to increase the delay over the link.

19. The method of claim 16, wherein:

changing the delay over the active communication link results from changing the FEC encoding scheme applied to the link.

20. The method of claim 16, wherein:

changing the delay over the active communication link results from changing the voice coding scheme applied to the link.

21. The method of claim 16, wherein:

changing the delay over the active communication link results from changing the slot timing.

* * * * *